March 23, 1948. C. E. TACK 2,438,481
DISC BRAKE ARRANGEMENT
Filed May 25, 1942 3 Sheets-Sheet 1

INVENTOR.
Carl E. Tack
BY
Atty.

March 23, 1948.　　　C. E. TACK　　　2,438,481
DISC BRAKE ARRANGEMENT
Filed May 25, 1942　　　3 Sheets-Sheet 2

INVENTOR.
Carl E. Tack
BY
Atty.

March 23, 1948.  C. E. TACK  2,438,481
DISC BRAKE ARRANGEMENT
Filed May 25, 1942  3 Sheets-Sheet 3

INVENTOR.
Carl E. Tack
BY
Atty.

Patented Mar. 23, 1948

2,438,481

UNITED STATES PATENT OFFICE 2,438,481

DISC BRAKE ARRANGEMENT

Carl E. Tack, Chicago, Ill., assignor to American Steel Foundries, Chicago, Ill., a corporation of New Jersey Application May 25, 1942, Serial No. 444,407

11 Claims. (Cl. 188—59)

My invention relates to a brake arrangement for a railway car truck and especially to a brake design commonly called off-wheel, wherein brake discs are supported to rotate with the wheel and axle assembly to afford braking surfaces independently of the tread surfaces of the wheels.

The general object of my invention is to devise an off-wheel brake arrangement wherein braking discs are supported to rotate with each wheel and axle assembly and a brake frame is carried by the truck frame and supports levers with brake shoes for frictional engagement at opposite sides of each brake disc.

A specific object of my invention is to devise such an arrangement as that described wherein the brake frame member supported at each end of the truck may be supported adjacent journal boxes at opposite sides of the truck and may be afforded a further torque connection at an intermediate point of the truck, thus providing a three point frame support.

A different object of my invention is to provide a three point brake frame support such as that described, so mounted that the shoes carried thereon will be supported eccentrically or non-concentrically with respect to the wheel and axle assembly on which the brake discs are mounted so that a washing action may be afforded said shoes against the adjacent discs, thus preventing the formation of concentric grooves in the brake surfaces of the discs, as more fully described in my co-pending application, Serial No. 421,418, said application being issued as United States Patent 2,355,120 on August 8, 1944.

Another object of my invention is to devise a three point supported brake frame with resilient connections at each support point which will be adapted to relative lateral movement of the wheel and axle assembly on which two of said support points are carried and the truck frame where the other support point has a torque connection, said torque connection comprehending an arrangement in which lateral movements of the brake frame are resisted in shear by resilient elements and all other movements of the brake frame are resisted in compression by said elements.

Still another object of my invention is to devise a novel form of combined equalizer seat and brake frame support casting which may seat upon each journal box and afford support for one end of the adjacent equalizer and an adjacent connection for one end of the associated brake frame, said last-mentioned connection affording limited resiliently controlled vertical, longitudinal and lateral movement of said brake frame with respect to the associated wheel and axle assembly.

A further object of my invention is to design a brake frame such as above described in which the portion of the brake frame connected to the associated truck frame by a torque connection such as above described may be detached from the associated cylinder housings so that the brake mechanism associated with each wheel may be easily removed independently of the mechanism associated with the wheel at the opposite side of the truck and both of said brake mechanisms may be readily removed without disconnecting the brake frame from the truck frame.

Still another object of my invention is to design a brake frame support such as that described comprising spaced cylinder housings mounted from the adjacent journal boxes and a torque tube extending between and connecting said housings, said tube affording a torque connection to the truck frame and being so connected to the housings as to permit the removal of the pistons received therein from inboard openings in said housings without dismantling the torque tube from the housings, thus facilitating inspection and removal of the pistons as will be clearly apparent.

In each of said figures certain details may be omitted where they are more clearly seen in other views.

Figure 3:
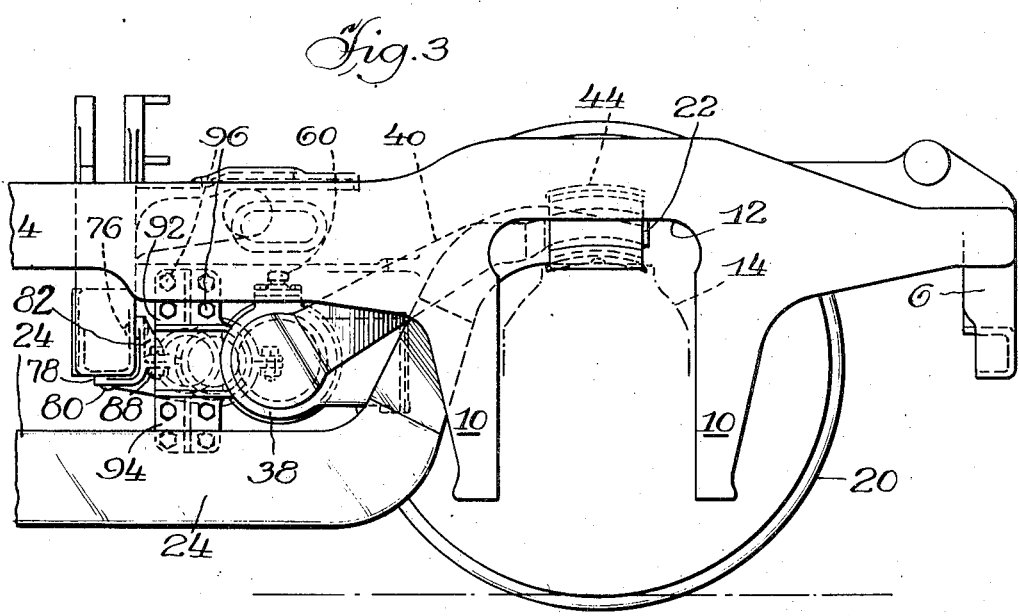
Figure 3 is a fragmentary side elevation of the arrangement shown in Figure 1.
Figure 4:
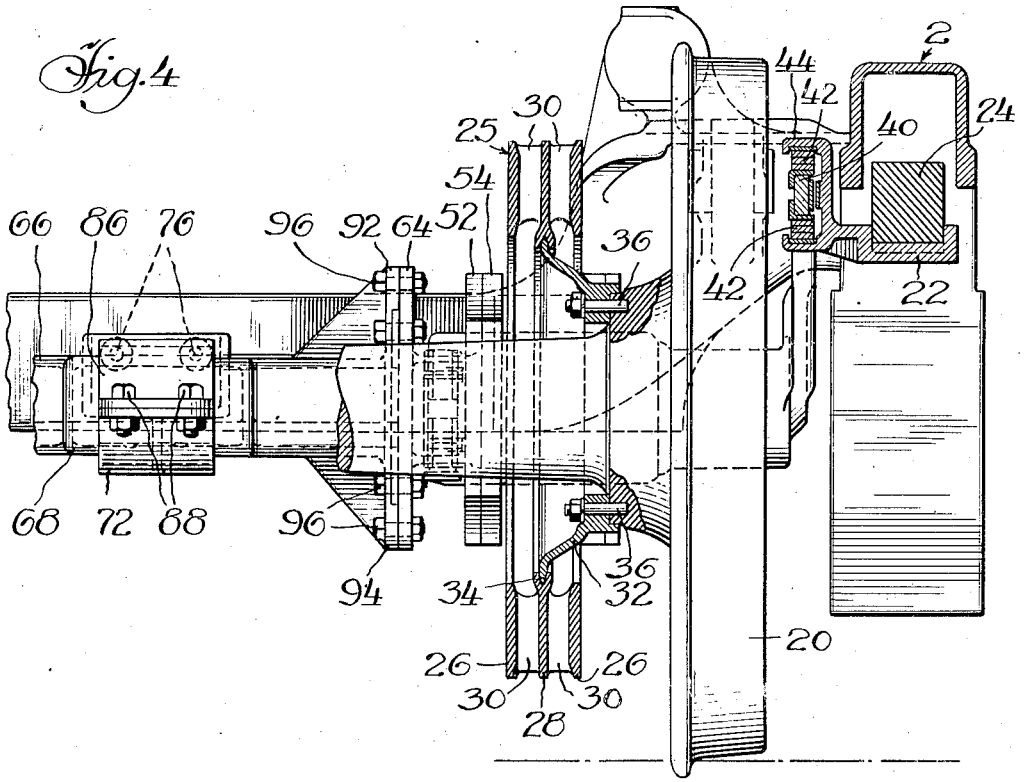
Figure 4 is an end view partly in section, the section being taken in the vertical planes indicated by the line 4—4 of Figure 1.

Describing my invention in detail, the truck frame 2 comprises the spaced side rails 4, 4, the end rails 6, 6, and the spaced intermediate transoms 8, 8, said transoms affording a means of connection to an associated bolster (not shown), said bolster affording support for the car body in the usual manner. At each end of each side rail 4 are the spaced pedestal jaws 10, 10 defining a pedestal opening 12, as best seen at the right in Figure 3, each pedestal opening 12 receiving the associated journal box 14, fragmentarily indicated in Figure 3, said journal box supporting a journal end of the associated wheel and axle assembly 16, said assembly comprising the axle 18 and the wheels 20, 20 supported on said axle adjacent opposite ends thereof. On each journal box 14 is positioned an equalizer seat 22, said equalizer seats 22, 22 affording positioning means for the equalizers 24, 24 at opposite sides of the truck, said equalizers affording a resilient support for the frame 2 in the usual manner. Secured to each wheel 20 is a rotor 25, said rotor comprising spaced annular friction plates 26, 26 and the intermediate annular support plate 28, and radial blades 30, 30 extending between each friction plate and said support plate as seen in Figure 4. A disc-like hub member 32 is engaged at 34 with the inner periphery of the support plate 28, and said hub member is secured to the associated wheel 20 by means of the spaced stud bolts 36, 36. The form and arrangement of the rotors 25, 25 may best be understood by a comparison of Figures 1 and 4.

Figure 2:
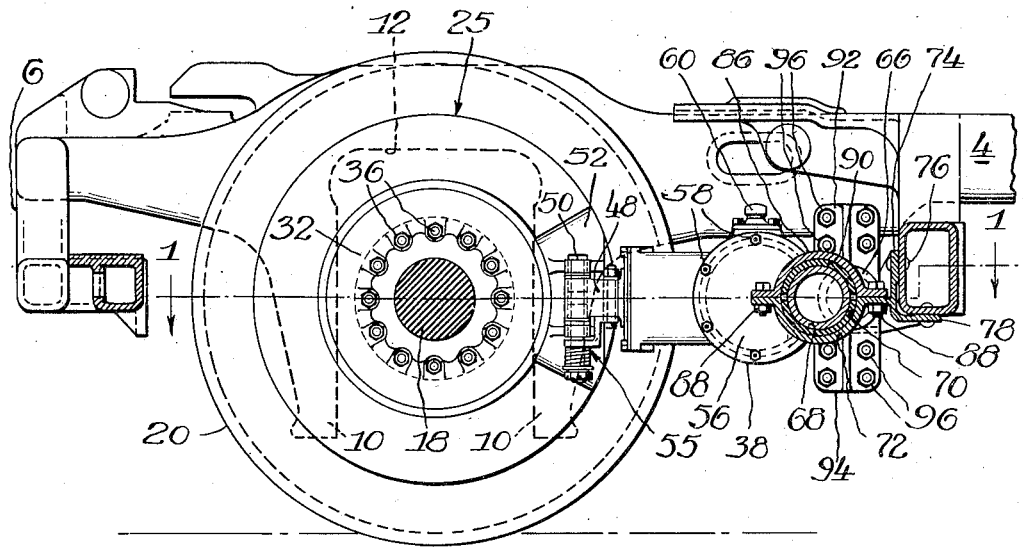
Figure 2 is a partially sectional side view of the truck and brake arrangement shown in Figure 1, the section being taken substantially in the vertical longitudinal plane bisecting the truck as indicated by the line 2—2 of Figure 1.

The braking means for each rotor comprises a cylinder housing 38 having the integral torque arm 40 clamped between vertically spaced resilient means 42, 42 received and retained within the jaw 44 on the adjacent equalizer seat 22, heretofore described. Pivoted within the cylinder housing 38 at 46, 46 are the brake levers 48, 48 affording a pivotal connection at 50, 50 respectively for the brake heads 52, 52, said heads carrying brake shoes 54, 54 for engagement with the associated friction plates 26, 26 of the rotor 25. Balancing means generally designated 55 (Figure 2) is provided to maintain each brake head 52 in proper position for application to the rotor 25, said balancing means being more fully described in my said co-pending application.

Each housing 38 is provided with a cover plate 56 secured at 58, 58, said plate being readily removable to permit access to and removal of the enclosed pistons (not shown), said pistons being formed and arranged for actuation of the brake levers 48, 48, as more fully described in my said co-pending application, and each housing 38 is also provided with a nozzle 60 affording convenient attaching means for a fluid supply pipe (not shown). On the inboard side of each cylinder housing is formed an integral lug 64 serving a purpose hereafter more fully described.

A torque tube or beam 66 extends between the cylinder housings 38, 38 at opposite sides of the truck and each tube 66 comprises an offset portion 68 formed and arranged for a torque connection to the adjacent transom 8. The offset portion 68 of the tube 66 is seated on a resilient pad 70 positioned in the semi-cylindrical bracket 72 comprising the vertical web 74 secured at 76, 76 to the adjacent transom and the horizontal web 78 underlying said transom and secured thereto at 80, 80. The vertical web 74 is reinforced by the spaced vertical webs 82, 82 defining therewith a pocket 84 for the reception of a flange on the semi-cylindrical cover 86 secured at 88, 88 to the bracket 72. A resilient pad 90 (Figure 2) is positioned between the cover 86 and the torque tube, and it will be understood that when the torque tube 66 is placed in the bracket 72 and the cover 86 is bolted to the bracket, the tube will be compressed between the resilient pads 70 and 90 so that the tube is resiliently restrained against movement in every direction, the resilient pads 70 and 90 resisting vertical, longitudinal and twisting movement in compression and transverse movements in shear, as will be clearly understood from a consideration of Figures 1 and 2.

It will be readily apparent that the connection of each torque tube 66 to the associated housings is at one side of the cover plates 56, 56 and the openings in the cylinder housings sealed by said cover plates whereby the cover plates may be readily removed, and the pistons within the cylinders integrally formed inside the housings may be readily removed without dismantling the torque tube 66 from the cylinder housings. Each end of the torque tube 66 is formed with the vertical webs 92 and 94 on the top and bottom thereof, said webs being secured at 96, 96 by bolt and nut assemblies to the associated lug 64 of the adjacent cylinder housing 38.

Figure 1:
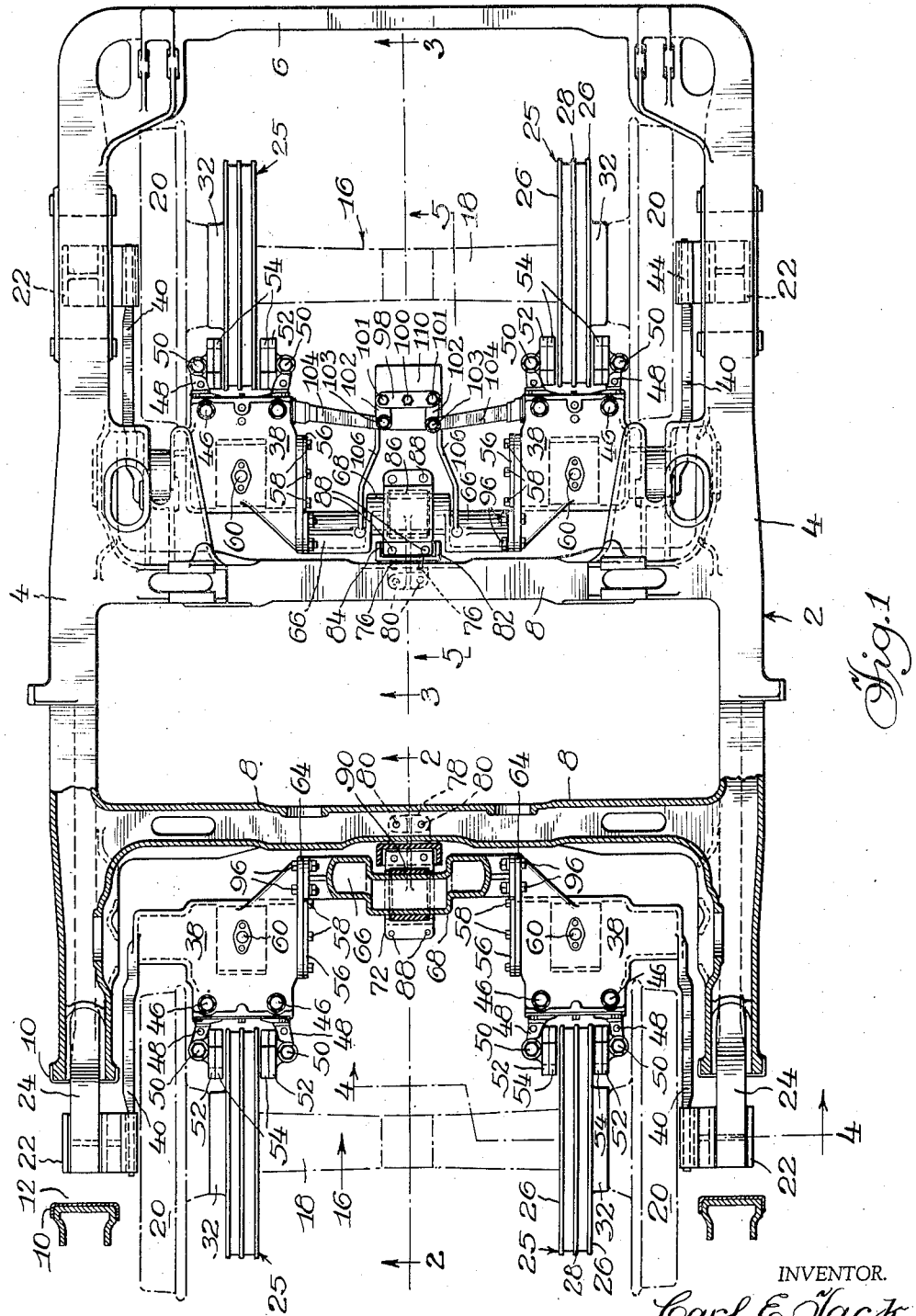
Figure 1 is a top plan view of a railway car truck embodying my invention, the left half thereof being partly in section with the section taken approximately in the horizontal planes indicated by the lines 1—1 of Figure 2.
Figure 5:
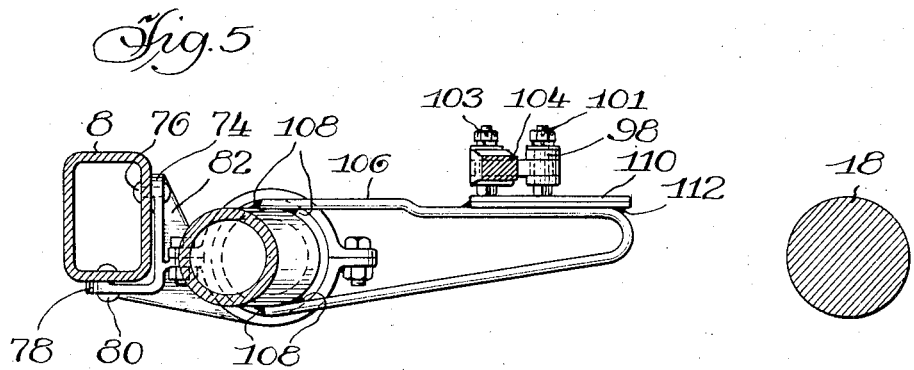
Figure 5 is a sectional view taken in the plane indicated by the line 5—5 of Figure 1.

Hand brake means is provided for the brake rigging at one end of the truck, as shown at the right in Figure 1, said hand brake means comprising an equalizer bar 98 affording connection at 100 intermediate its ends to actuating means (not shown), the jaw ends of the bar 98 being pivotally connected at 101, 101 to the links 102, 102, said links being connected at 103, 103 to respective hand brake actuating levers 104, 104, each of said hand brake actuating levers extending into the adjacent cylinder housing 38 for actuation of the brake levers 48, 48 in a manner fully described in my said co-pending application. Support for the hand brake means is provided by a pair of bent rods 106, 106 welded at 108, 108 to the torque tube 66 and a wear plate 110 welded at 112 to the rods 106, 106, said wear plate supporting the equalizer bar 98, the links 102, 102, and the ends of the hand brake actuating levers 104, 104 as will be clearly understood from a consideration of Figure 5 and the right half of Figure 1.

Thus it will be apparent that I have designed a novel form of off-wheel brake rigging in which cylinder housings are nonconcentrically or eccentrically supported with respect to the associated wheel and axle assemblies from the journal boxes associated therewith, the housings at opposite sides of the truck being connected by a readily removable torque tube, said tube being connected to the associated transom by means of a device permitting but resiliently resisting movement of the tube in every direction, transverse movements of the tube being resisted in shear and all other movements being resisted in compression.

It will also be understood that the cylinder housings 38, 38 at each end of the truck and the torque arms 40, 40 on respective housings, and the interconnecting torque tube 66 form a C-shaped yoke or frame, said yoke being resiliently connected at an intermediate point to the truck frame by means of the bracket 72 and said yoke being resiliently supported at the ends thereof by means of the support of the torque arms 40, 40 from the associated equalizer seats 22, 22 mounted on the journal boxes. This yoke supports the brake levers 48, 48 which in turn support the friction shoes 54, 54 for engagement with the rotors 25, 25, and it will be apparent that the nonconcentric mounting of the yoke with respect to the adjacent wheel and axle assembly and the resiliently controlled movement of the yoke vertically and longitudinally of the truck permit the shoes 54, 54 to wash the friction surfaces of the friction plates 26, 26 of the associated rotors and thus prevent formation of concentric grooves in said discs, as more fully described in my said co-pending application.

It will also be readily apparent that in the present arrangement the readily removable torque tube 66 permits the dismantling of either of the associated cylinder housings without disturbing the other housing and also permits the dismantling of both housings without disturbing the torque connection of the tube 66 to the truck frame, thereby facilitating inspection and repair of the brake mechanism.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement, a wheel and axle assembly, rotatable brake discs mounted thereon, cylinder housings antifrictionally supported from said assembly adjacent respective discs, friction means supported from said housings for engagement with said discs, openings in the adjacent sides of said housings for the insertion and removal of operating means associated with said friction means, a member connecting said housings, and means engaged with said member for restraining its rotation with respect to said assembly during engagement of said friction means and said discs, said member being formed and arranged to permit the insertion and removal of said operating means without disconnecting said member from said housings.

2. In a brake arrangement, a vehicle frame, a supporting wheel and axle assembly, cylinder housings supported from said assembly adjacent opposite ends thereof, inboard openings in said housings, brake discs rotatably mounted on said assembly adjacent respective housings, friction means supported from said housings for engagement with said discs, operating means in said housings associated with respective friction means, a member extending between and connected to said housings, and means connecting said member to said vehicle frame, said member and said housings being formed and arranged to permit the insertion and removal of said operating means through said openings without disconnecting said member from said housings.

3. In a brake arrangement for a railway car truck comprising a truck frame and a supporting wheel and axle assembly, the combination of spaced housings with openings in the inboard sides thereof, brake means carried by said housings and extending therefrom for cooperation with said assembly to decelerate the same, actuating means in said housings for said brake means, and rigid means interconnecting the housings at points spaced from but adjacent said openings to form a single structure with said housings, said openings accommodating insertion and removal of said actuating means therethrough without dismantling said structure.

4. In a brake arrangement for a vehicle comprising a vehicle frame and a supporting wheel and axle assembly, the combination of a housing supported from said assembly adjacent an end thereof, brake means carried by said housing for decelerating said assembly, actuating means within said housing for said brake means, a support structure for said housing connected to the inboard side of said housing and to said frame, and an opening in said housing adjacent said structure and spaced laterally therefrom for accommodating insertion and removal of said actuating means relative to said housing without dismantling said housing with respect to said structure or assembly.

5. In a brake arrangement for a railway car truck comprising a truck frame and a supporting wheel and axle assembly, the combination of a housing supported from said truck adjacent said assembly, a brake lever fulcrumed to said housing, friction means carried by said lever for engagement with a surface of said assembly, actuating means within said housing for said lever, a support element for said housing connected to the inboard side of said housing and to a transversely extending member of said frame, and an inboard opening in said housing spaced from said element accommodating insertion and removal of said actuating means without disassembling said housing from said element.

6. In a brake arrangement for a railway car truck comprising a truck frame and a supporting wheel and axle assembly, the combination of a housing adjacent said assembly, a support structure for said housing connected to the inboard side thereof and to said frame, brake means carried by said housing for decelerating said assembly, actuating means in said housing for said brake means, an opening on the inboard side of said housing accommodating insertion and removal of said actuating means without dismantling said structure and housing, and a cover plate for said opening independent of said structure removably secured to said housing.

7. In a brake arrangement for a railway car truck comprising a truck frame and a supporting wheel and axle assembly, the combination of a housing supported from said truck adjacent each end of said assembly, brake means carried by each housing for braking an associated surface of said assembly, an opening in the inboard side of each housing, readily removable actuating means within each housing, a beam interconnecting the housings and disposed at one side of said openings to accommodate removal and insertion of said actuating means therethrough without disconnecting said beam from said housings, and a torque connection between said beam and said frame at one side of said openings.

8. In a brake arrangement for a railway car truck comprising a truck frame and a supporting wheel and axle assembly, the combination of spaced housings, openings in the inboard sides thereof, brake means carried by said housings and extending externally thereof for cooperation with said assembly to decelerate the same, actuating means in said housings for said brake means, rigid means interconnecting the housings to form a single structure therewith, and means supporting said structure from said truck, said rigid means being disposed at one side of said openings to accommodate insertion and removal of said actuating means therethrough without disassembling said structure from said truck and said rigid means from said housings.

9. A brake unit for a railway car truck comprising a cylinder housing, brake levers fulcrumed thereto and extending externally thereof, an opening in the inboard side of said housing for the insertion and removal of actuating means associated with said levers, and means on said housing at one side and independent of said opening for connection to an associated support structure.

10. A brake beam for a railway car truck comprising spaced housings, brake means carried by each housing externally thereof for cooperation with an associated wheel and axle assembly, openings in the adjacent sides of said housings formed and arranged for the insertion and removal of actuating means associated with said brake means, and a frame interconnecting said housings at one side of said openings and independent thereof to permit said insertion and removal of said actuating means without dismantling said frame and housings.

11. A brake beam for a railway car truck comprising spaced housings, brake means carried by each housing externally thereof for cooperation with an associated wheel and axle assembly, openings in the adjacent sides of said housings formed and arranged for the insertion and removal of actuating means associated with said brake means, a brake beam interconnecting said housings at one side of said openings and independent thereof to permit said insertion and removal of said actuating means with respect to said housings without dismantling said housings and brake beam, and torque arms connected to the remote sides of said housings and adapted for connection to associated support structure.

CARL E. TACK.

REFERENCES CITED

The following references are of record in the file of this patent:

UNITED STATES PATENTS

| Number | Name | Date |
|---|---|---|
| 2,174,398 | Farmer | Sept. 26, 1939 |
| 2,228,818 | Eksergian | Jan. 14, 1941 |
| 2,355,120 | Tack | Aug. 8, 1944 |
| 2,413,614 | Eksergian | Dec. 31, 1946 |